US005941946A

United States Patent [19]
Baldwin et al.

[11] Patent Number: 5,941,946
[45] Date of Patent: Aug. 24, 1999

[54] SYSTEM FOR STORING MESSAGE IN A WIDE AREA NETWORK STORAGE CONTROLLED BY A SENDER AND NOTIFYING INTENDED RECIPIENTS OF THE AVAILABILITY AND THE WAN ADDRESS THEREOF

[75] Inventors: Michael Scott Baldwin, Plainfield; Paul C. Lustgarten, Westfield, both of N.J.

[73] Assignee: AT&T IPM Corp., Coral Cables, Fla.

[21] Appl. No.: 08/843,829

[22] Filed: Apr. 21, 1997

Related U.S. Application Data

[63] Continuation of application No. 08/425,968, Apr. 20, 1995, abandoned.

[51] Int. Cl.$^6$ .................................................. G06F 13/14
[52] U.S. Cl. .................................. 709/206; 358/402
[58] Field of Search ..................... 379/88, 201; 358/402; 385/200.36; 709/206

[56] References Cited

U.S. PATENT DOCUMENTS

| | | | |
|---|---|---|---|
| 4,503,499 | 3/1985 | Mason et al. | 395/650 |
| 4,625,081 | 11/1986 | Lotito et al. | 379/88.26 |
| 4,760,572 | 7/1988 | Tomikawa | 370/94 |
| 4,837,798 | 6/1989 | Cohen et al. | 379/396 |
| 4,845,658 | 7/1989 | Gifford | 364/932.8 |
| 4,902,881 | 2/1990 | Janku | 235/381 |
| 4,974,149 | 11/1990 | Valenti | 364/200 |
| 5,123,089 | 6/1992 | Beilinski et al. | 709/200 |
| 5,144,557 | 9/1992 | Wang et al. | 707/9 |
| 5,333,266 | 7/1994 | Boaz et al. | 395/200.01 |
| 5,339,361 | 8/1994 | Schwalm et al. | 380/23 |
| 5,404,231 | 4/1995 | Bloomfield | 358/400 |
| 5,550,976 | 8/1996 | Henderson et al. | 395/200.06 |
| 5,608,786 | 3/1997 | Gordon | 379/100 |
| 5,790,793 | 8/1998 | Higley | 395/200.48 |

OTHER PUBLICATIONS

Computer Dictionary, Microsoft Press, p. 416, 1994.
Miller J G et al: "Accessing Messages Your Way" AT&T Technology, vol. 10, No. 1, Mar. 21, 1995.
Thim H et al: "A Mail–Based Teleservice Architecture For Archiving and Retrieving Dynamically Compsable Multi-media Documents" Multimedia Transport and Teleservices . International Cost 237 Works Proceedings, Vienna Nov. 13–15, 1994.
Thomas R. H. et al: "Diamond: A Multimedia Message System Built on a Distributed Architecture" Computer, vol. 18, No. 12, Dec. 1, 1985 pp. 65–78.
Wilkinson C F: "X.400 Electronic Mail" Electronics and Communication Engineering Journal, vol. 3, No. 3, Jun. 1, 1991 pp. 129–136.
Search report from the European Patent Office.
N. Borenstein et al.: MIME (Multipurpose Internet Mail Extensions) Part One: Mechanisms for Specifying and Describing the Format of Internet Message Bodies, available on the Internet at http://ds.internic.net/rfc/rfc1521.txt.

*Primary Examiner*—Thomas C. Lee
*Assistant Examiner*—Abdelmoniem I Elamin
*Attorney, Agent, or Firm*—Morgan & Finnegan, L.L.P.

[57] ABSTRACT

A method for electronic communication using wide area network (WAN) storage and signalling capabilities. The method and apparatus provides for deposit of a message in message stores in the WAN, storage of the message such that the message is uniformly accessible throughout the WAN and notifying the recipient of the message of the availability and address of the message in the message stores in the WAN so that he can access the message.

14 Claims, 3 Drawing Sheets

SYSTEM FOR STORING MESSAGE IN A WIDE AREA NETWORK STORAGE CONTROLLED BY A SENDER AND NOTIFYING INTENDED RECIPIENTS OF THE AVAILABILITY AND THE WAN ADDRESS THEREOF

This is a continuation of application Ser. No. 08/425,968, filed Apr. 20, 1995, now abandoned.

TECHNICAL FIELD

This invention relates to a method and apparatus for providing electronic communications.

BACKGROUND OF THE INVENTION

Messaging can be defined as time-delayed communication or communication in which the origination of the communication occurs asynchronously from its reception. For example, letters and public notices are traditional form of messaging. Messaging also includes traditional forms of publishing, whether text/image-based (e.g. memoranda, books and periodicals), audio-based (e.g. tapes and compact discs) or audio/visually-based (e.g. movies). Other forms of messaging include voice mail, including multi-user systems and answering machines, and electronic counterparts of traditional messaging, for example telegrams, cablegrams, faxes, telex, electronic mail, asynchronous computer-based conferencing (i.e. bulletin-boards) and electronic publishing.

Because messaging is communication across time, messaging requires storage of the message content. The way in which the message is stored can be used to distinguish types of messaging.

"Store-and-forward" messaging is one type of electronic messaging system. In store-and-forward messaging, a message is transmitted from its sender to its recipient through at least one "message transfer agent" (MTA). The message can be relayed through as many successive MTAs as are needed for the message to reach its final destination. Each MTA independently chooses the next MTA to which to route the message, based on information carried along with the message, such as its intended recipient, together with information held by the MTA, such as routing tables. If a message is directed to more than one recipient, an MTA can multicast the message by sending copies of the message to separate MTAs for forwarding to each intended recipient. When the message reaches an MTA that has direct access to the recipient's mailbox, the message is deposited in local area network (LAN) storage associated with the recipient's mailbox. The LAN storage associated with recipient's mailbox is comprised of message stores for storing messages deposited therein.

During the messaging transmission process, each MTA temporarily stores the message, until the message is transferred to another MTA or deposited in the LAN storage associated with the recipient's mailbox. Thus, the MTAs constitute a succession of storage locations and the message is forwarded from MTA to MTA until ultimately reaching the recipient's mailbox.

Referring to FIG. 1, the general structure of store and forward messaging as applied to LAN messaging and wide area network (WAN) messaging is shown. With respect to LAN messaging, a message can be sent from a sender at a sender station 1 to a recipient at a recipient station 2 through a LAN 3. The message is transmitted from the sender station 2 through an MTA 6 in LAN 3. MTA 6 has a message store 12 that stores the message temporarily until the MTA, acting on information carried along with the message, routes the message. Because MTA 6 has direct access to the recipient's mailbox 4, MTA 6 deposites the message into LAN 3 storage associated with the recipient's mailbox 4. The recipient can then access the message in his mailbox 4 from the recipient station 2.

With respect to WAN messaging, a series of LAN systems may be connected together (not shown) or LAN systems may be connected through an intermediate WAN (shown in FIG. 1) to permit WAN messaging. As shown in FIG. 1, a message can be sent from the sender at sender station 1 to a recipient at a recipient station 11 through MTA 6 in LAN 3, MTA's 7, 8 and 9 in a WAN 17 and an MTA 10 in a LAN 5. MTA's 6, 7, 8, 9 and 10 have messages stores 12, 13, 14, 15 and 16, respectively, that store the message temporarily until the MTA, acting on information carried along with the message, routes the message. The message is transmitted from sender station 1 to MTA 6 in LAN 3. MTA 6 routes the message to MTA 7 in WAN 17. MTA 7 in turn routes the message to MTA 8 in WAN 17 and MTA 8 in turn routes the message to MTA 9 in WAN 17. MTA 9 routes the message to MTA 10 in LAN 5. MTA 10 has direct access to the recipient's mailbox 18 and deposits the message into the LAN 5 storage associated with the recipient's mailbox 18. The recipient can access the message in his mailbox 18 from the recipient station 11.

Because store-and-forward messaging is an application specific overlay on a network, it has limitations. For example, the costs involved are spread only among the users of the store-and-forward messaging application. Moreover, the scope of messaging is limited to users of that application. Finally, diverse message formats and conversion from one format to another them are not readily accommodated.

SUMMARY OF THE INVENTION

The above problems are solved in accordance with the principles of the invention by providing a method and apparatus for WAN messaging using WAN storage and signalling capabilities. The invention generally includes three aspects: message origination, message storage and message reception.

Message origination includes the sender's deposit of a message into at least one message store on the WAN, identification of the addresses of the intended recipients and notification of each of the intended recipients of the availability and address of the message on the WAN.

Message storage refers to the characteristics of storage in the WAN. The message stores and the messages stored have a logical identity in the WAN independent of their physical realization such that uniform accessibility is provided throughout the WAN.

Message reception refers to the recipient's processing of the message. Message reception is provided via "virtual mailboxes" that reside in storage elements on the WAN. The recipient's virtual mailbox does not contain his messages. Instead, it serves as an aggregation and storage point for the signaling information that notifies the recipient of the availability and address of his messages on the WAN. The recipient's station uses the signaling data to alert the recipient of the existence of his messages and to retrieve the messages under the recipient's direction.

DETAILED DESCRIPTION

Figure 1:
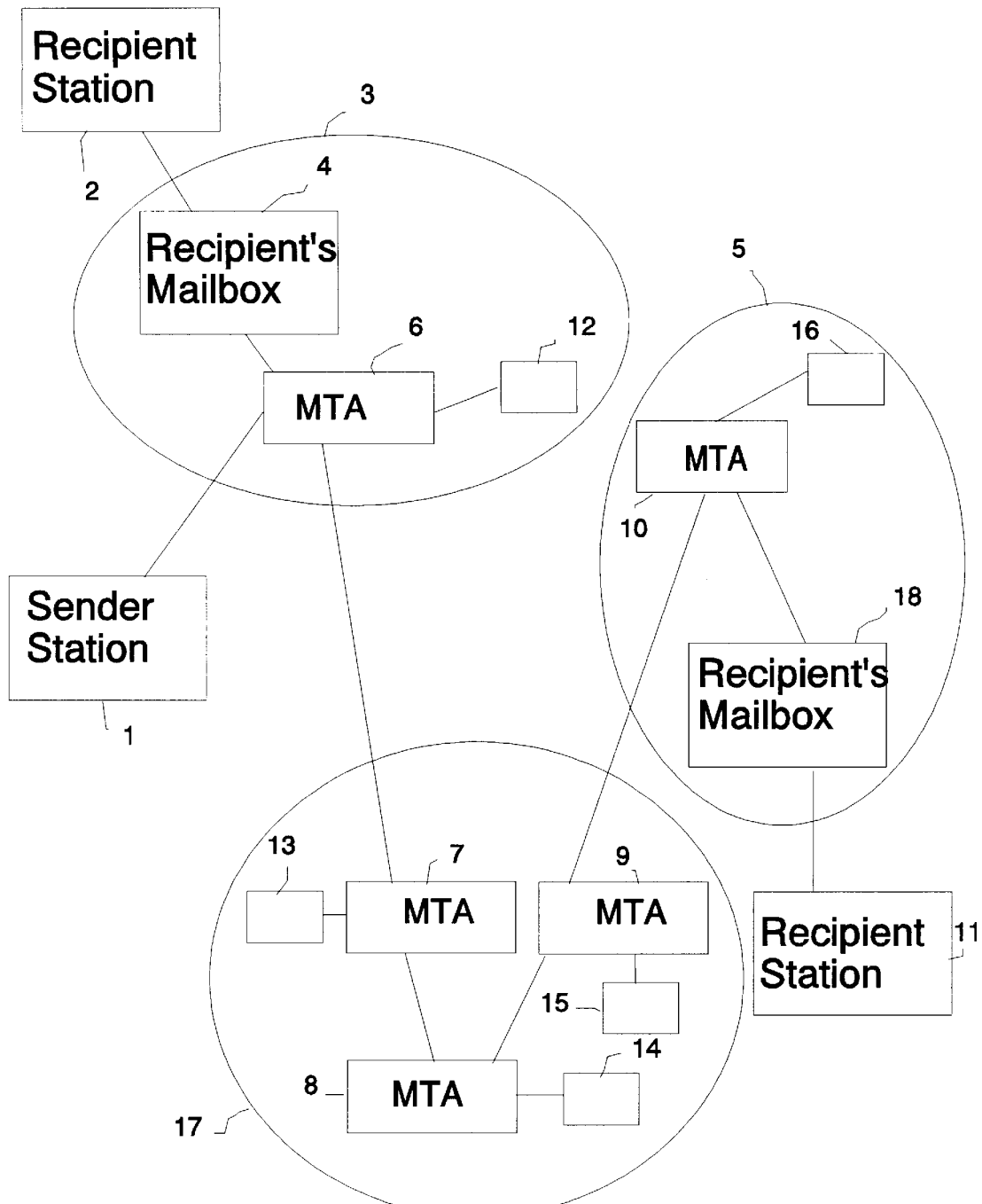
FIG. 1 is a block diagram showing the structure of store-and-forward messaging.
Figure 2:
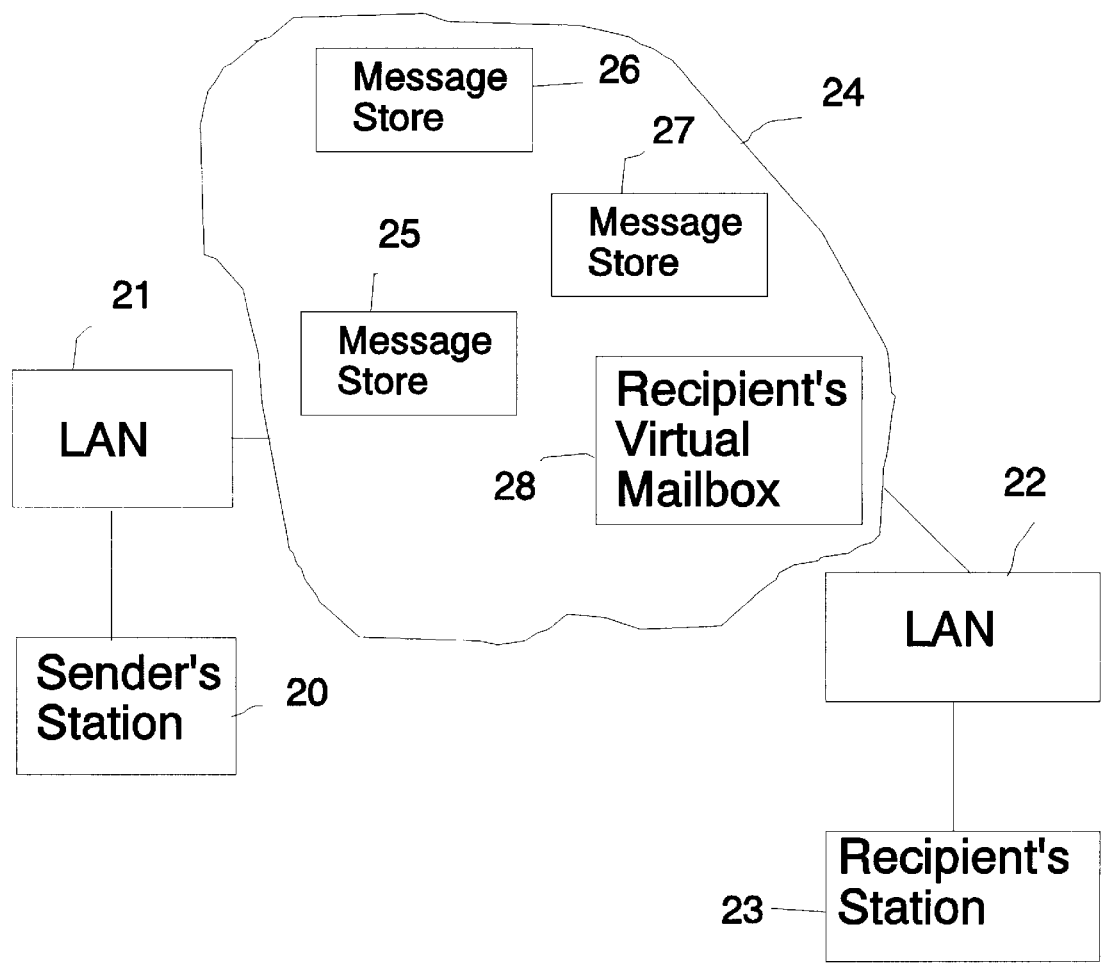
FIG. 2 is a block diagram showing the structure of an embodiment of the invention.

Referring to FIG. 2, the structure of an embodiment of the invention is shown. The sender's station 20 is connected to a LAN 21 which is connected to a WAN 24 and the recipient's station 23 is connected to a LAN 22 which is connected to WAN 24. LAN 21 and LAN 22 do not require message stores because the WAN 24 includes message stores, such as message stores 25, 26 and 27, for storing messages. WAN 24 also includes virtual mailboxes, such as the recipient's virtual mailbox 28, for storing information regarding the availability and address of the recipient's messages.

To deposit a message into message stores in the WAN, the sender at a sender station allocates storage from the WAN by selecting at least one message store from those residing in storage elements integrated into the WAN and fills that message store with the contents of the message.

The storage location of a message may be chosen by the sender's station. For example, if all messages for a given recipient are stored in one location, the sender's station directly deposits the message into those message stores and, if there are multiple recipients, the sender's station deposits the message to the message stores associated with each of the recipients. Alternatively, if the recipients do not have locations dedicated to storage of their messages, the message is deposited in message stores in the WAN selected by the sender and accessible to all of the intended recipients through multiplexed access to the message stores, effectively consolidating the storage required. Consolidated storage is especially advantageous because it provides for administrative simplicity, more efficient use of storage resources and, as explained more fully below, open-ended sets of recipient to facilitate group communications and electronic publishing.

To signal the intended recipients, the recipients are notified of the message's availability and its address on the WAN. The signaling process begins with the determination of the addresses of the recipients. The sender may know the addresses of the intended recipients or may need to refer to network-based interactive directories. Once the recipients' addresses are determined, the sender at a sender station instructs the WAN to notify the recipients of the availability and address of the message via the signaling mechanisms of the WAN.

In addition, the sender may store access authorization information for the message with the message in the message store. The access authorization information may be the list of intended recipients, unlimited in the case of publically available information or specified by identifiable characteristics of a group, for example security clearance, organizational affiliation or subscribers to a service. The access authorization information for a message can be different than the persons signaled of the availability of message. For example, a group may be authorized to access a message, such as being signaled of its availability, such as the members of a particular project.

The sender need not signal all of the recipients at the same time. For instance, if the sender were to think of an additional recipient a day after sending the message, resending it would require only signaling the additional recipient and, perhaps, notifying the message store to add the additional recipient to the list of persons authorized to access the message.

In many messaging applications, the recipients are not explicitly enumerated by the sender, but are determined instead through processes such as self-selection, third-party reference or guided searching. In such cases, the signaling process may be absent. For example, a recipient can select a message by browsing through accessible message stores, by receiving a reference to it from a friend, co-worker or from another message or by searching through messages on the basis of keywords or other identifier provided by the sender. In such situations the new recipient must be authorized to access the message. The access authorization information may be broad enough to already include the new recipient or a recipient may be allowed to extend the access authorization to include a new recipient.

The message stores have the following characteristics. The message stores are located in storage elements integrated into the WAN. This functional integration is independent from questions of ownership or physical location.

The message stores and the messages stored therein have a logical identity in the WAN, independent of their physical realization at any given moment. This enables greater reliability and efficiency by, for example, distributing the storage of a given message across multiple message stores.

The message stores are uniformly accessible from throughout the WAN. This means that they offer the same functionality independent of their physical location or that of the person accessing the message. As different recipients access a given message store from arbitrary locations, the functionality available to each recipient from the message store varies only with the characteristics of the recipient station used by the recipient to access the message store and its connection to the WAN (e.g. bandwidth).

Access to message stores can be multiplexed, allowing concurrent access by multiple senders and recipients. Thus, the senders and recipients are unlikely to be blocked when sending or receiving messages as can be the case with storage elements having more limited connectivity to the WAN.

The message stores control access to the messages they contain in accordance with the access authorization information provided by the sender.

Message reception is provided for via "virtual mailboxes." A virtual mailbox resides in storage elements in the WAN, but does not store the content of the recipient's messages. Instead, a virtual mailbox serves as an aggregation and storage point for signaling information that notifies a recipient of the availability and address of a message on the WAN. The recipient's station makes use of this signaling information to alert the recipient of the existence and availability of the message and to retrieve the message under the recipient's direction.

Because a recipient's messages can reside in multiple message stores spread throughout the network, the essence of the signaling information contained in the virtual mailbox is the reference to messages available to the recipient. Because of uniform accessibility to the message stores, the recipient's station can make use of those references to retrieve the recipient's messages. Through the use of the information stored in the virtual mailbox, the recipient can access his messages residing in multiple message stores in the WAN as if all of his messages were stored in a single mailbox.

The messages referenced in the virtual mailbox may include any type of information, from any medium. For example, a virtual mailbox could hold references to a text message on one LAN server, an audio message on another LAN server, another audio message on a voice-mail adjunct to a PBX or an audio/video message in another LAN server.

Figure 3:
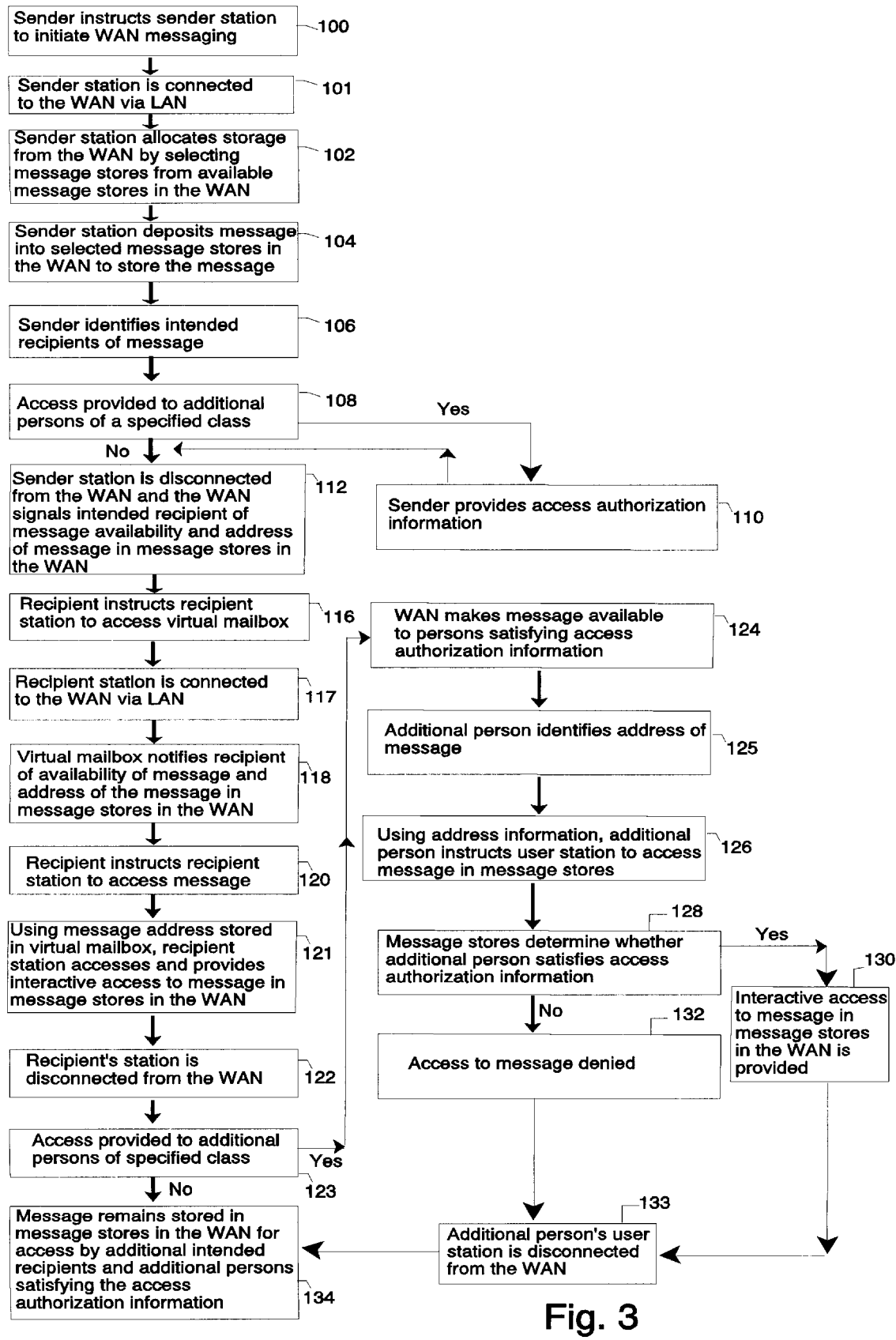
FIG. 3 is a flow diagram illustrating the processing of messaging in accordance with an embodiment of the invention.

Referring to FIG. 3, a flow diagram illustrating the process of messaging in accordance with an embodiment of the invention is shown. To send a message, the sender instructs his sender station 20 to initiate WAN messaging (step 100). LAN 21 connects sender station 20 to WAN 24 (step 101). The sender station 20 allocates storage from WAN 24 by selecting message stores, e.g. message stores 25, 26 and 27, from available message stores in WAN 24 (step 102). The sender station deposits the message into the selected message stores in the WAN and the message is stored in the selected message stores (step 104).

The sender identifies the intended recipients of the message (step 106). If the sender would like to provide access to additional persons of a specified class, the sender may provide message access authorization information such that additional persons falling within the specified class of authorized persons can access to the message (steps 108, 110).

In response to deposit of the message and identification of intended recipients by the sender, sender's station 20 is disconnected from WAN 24 and the WAN signals the intended recipient of the availability and address of the message in the message stores in the WAN by placing a reference to the message in the recipient's virtual mailbox 28 (step 112).

To receive the message, the recipient instructs the recipient station 23 to access his virtual mailbox 28 (step 116). LAN 22 connects recipient station 23 to WAN 24 (step 117). The virtual mailbox 28 contains a reference notifying the recipient of the availability and address of the message (step 118). The recipient instructs the recipient station 23 to access the message (step 120). Using the message address stored in virtual mailbox, the recipient station accesses and provides the recipient with interactive access to the message stored in message stores in the WAN (step 121). After access to the message is complete the recipient station is disconnected from the WAN 24 (step 122).

If the sender has made the message accessible to additional persons of a specified class, the WAN also makes the message available to persons satisfying the access authorization information (steps 123, 124). Once such a person identifies the address of the message through, for example, the means referred above (step 125) using the address information, he can instruct his user station to access the message (step 126).

When such a person attempts to access the message, the message store 26 verifies that the person satisfies the access authorization information (step 128). If the access authorization information is satisfied, interactive access to the message is provided (step 130). If the access authorization information is not satisfied, access to the message is denied (step 132). Thereafter, the recipient's station is disconnected from the WAN 24 (step 133).

After the message has been accessed by the recipient and/or additional persons of the specified class, the message remains stored in the message stores in the WAN for access by additional intended recipients and other persons satisfying the access authorization information (step 134).

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method for electronic messaging in a wide area network (WAN), comprising the machine-implemented steps of:

at the request of a sender of a message, storing the content of a first message in storage allocated for the first message in the sender's local area network (LAN). the storage having a first WAN address;

signaling to an electronic mailbox of a predetermined recipient of the message, the availability of the message and the WAN address of the allocated storage;

at the direction of a second sender, allocating storage in the second sender's LAN and storing therein a second message content, the storage for the first and second message contents being allocated on different servers;

signaling the message recipient's electronic mailbox of the availability of second message and the WAN address of allocated storage containing the second message content; and at the demand of the message recipient, transmitting the second message content over the WAN from the second sender's allocated storage through the use of the WAN address of the second message content.

2. The method of claim 1, wherein the message recipient is a first message recipient and further comprising the step of:

signaling a second predetermined recipient's electronic mailbox of the availability of the message and the WAN address of the allocated storage; and at the demand of the second message recipient, transmitting the message content over the WAN from the sender's allocated storage through the use of the WAN address of the message content.

3. The method of claim 1, wherein the signaling step further comprises:

signaling the availability of the message and the WAN address of the message to all members of a class selected by the sender.

4. The method of claim 1, wherein signaling of the message to the second message recipient's electronic mailbox is initiated by the sender after the message has been signaled to the first message recipient.

5. The method of claim 1, further comprising the step of:

providing access to the stored message through a browsing facility.

6. The method of claim 1, further comprising the step of:

providing storage and retrieval of said message content distributed among nodes of the WAN separated by wide-area links of the WAN.

7. The method of claim 1, wherein the message content is stored at the direction of the sender in storage allocated from a pool in the sender's local area network (LAN) of available message stores.

8. A sender's node for sending an electronic message in a wide area network (WAN), comprising:

a means for depositing a first message content into storage having a first WAN address, the storage being under allocative control of the sender of the message;

a means for signaling to a predetermined recipient's electronic mailbox the availability of the message and the WAN address of the message content in the allocated storage; and a means for, on receipt of a demand signal from a recipient's node of the WAN, the demand signal being responsive to the recipient's receipt of the availability signal and identifying the first WAN address of the first message content to be retrieved, transmitting the first message content from the sender's allocated storage, and a means for transmitting the message content over at least one WAN link to the recipient; and a means for signaling the message recipient's electronic mailbox of a second message and a second WAN address of the second message in storage allocated by a sender of the second message, the storage of the first and second messages being allocated on different servers.

9. The sender's node of claim 8, further comprising:

means for automatically recording the recipient's receipt of the message contents.

10. The sender's node of claim 8, further comprising:

means for signaling the availability of the message and the WAN address of the message content to electronic mailboxes of all members of a class selected by the sender.

11. The sender's node of claim 8, further comprising:

providing access to the stored message contents through a browsing facility.

12. The sender's node of claim 8, wherein the message recipient is a first message recipient, and further comprising:

means for signaling a second predetermined recipient's electronic mailbox of the availability of the message and the WAN address of the allocated storage; and means for at the demand of the second message recipient, transmitting the message content over the WAN from the sender's allocated storage through the use of the WAN address of the message content.

13. The sender's node of claim 8, wherein the message recipient is a first message recipient and further comprising:

a means for, essentially concurrently with signaling the first recipient's electronic mailbox, signaling the availability of the first message and the WAN address of the first message content in the allocated storage to a predetermined second message recipient's electronic mailbox, the second recipient being at a different node of the WAN from the first recipient; and a means for, on receipt of a demand signal from a second recipient's node of the WAN, the second demand signal being responsive to the second recipient's receipt of the availability signal and identifying the message content to be retrieved, using the WAN address of the message first content to retrieve the first message content from the sender's allocated storage, and transmitting the first message content over at least one WAN link to the second recipient.

14. A recipient's node for receiving an electronic message in a wide area network (WAN), comprising:

an electronic mailbox for receiving and storing a signal from a sender, the sender's signal having been originated at the demand of the sender and identifying a first available message and a WAN address of the first message content in storage, the WAN address designating storage in which the sender has stored the first message content;

a means responsive to the demand of a message recipient for using the WAN address of the message content to retrieve the message content from the sender's allocated storage over at least one WAN link;

the electronic mailbox being further configured to receive and store a signal from a second sender, the second sender's signal having been originated at the demand of the second sender and identifying a second available message and a WAN address of the second message content in storage, the second WAN address designating storage in which the second sender has stored the message content, the second storage residing on a network node distinct from the storage for the first message content; and a means for, at the demand of the message recipient, using the WAN address of the second message content to transmit the message content from the second sender's allocated storage over at least one WAN link.

* * * * *